Oct. 4, 1927.
C. IRVINE
1,644,019
STARTING CRANK FOR INTERNAL COMBUSTION ENGINES
Filed Sept. 27, 1926
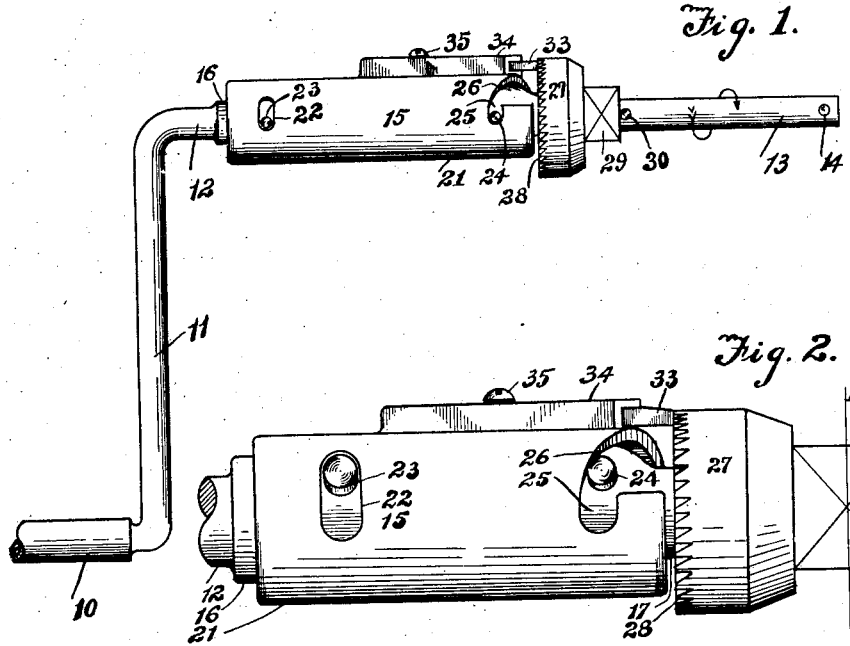
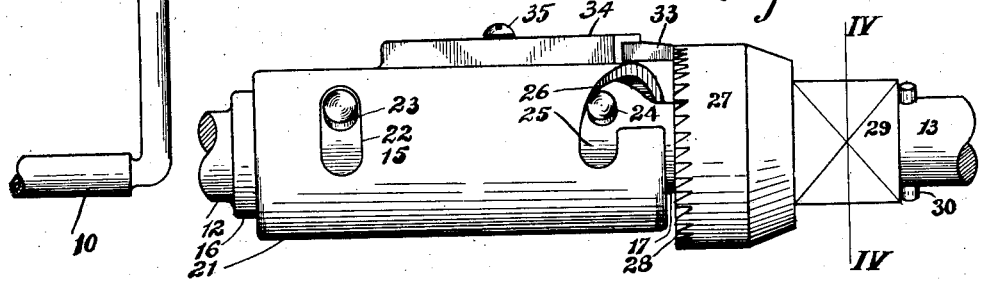
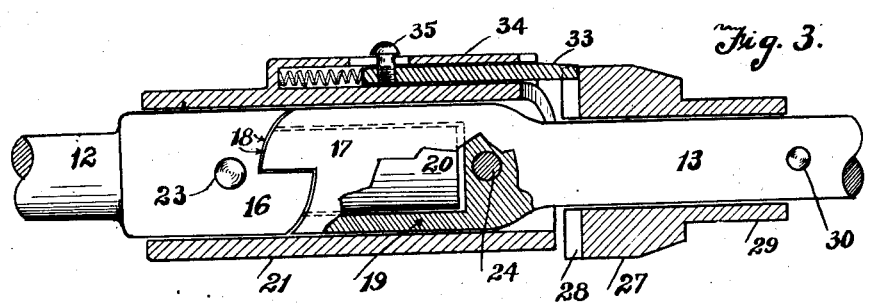
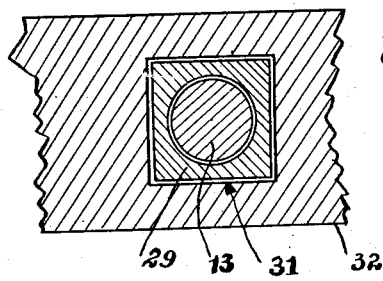
Inventor
Charles Irvine
By Frederick E. Bromley
Attorney.

Patented Oct. 4, 1927.

1,644,019

UNITED STATES PATENT OFFICE.

CHARLES IRVINE, OF TORONTO, ONTARIO, CANADA.

STARTING CRANK FOR INTERNAL-COMBUSTION ENGINES.

Application filed September 27, 1926. Serial No. 138,059.

The invention relates to improvements in starting cranks for internal combustion engines as described in the present specification and shown in the accompanying drawings which form part of the same.

The invention has for its object the provision of a safety starting crank which in the event of an engine of a car backfiring will operate to prevent backward motion being communicated to the crank handle in order to preclude injury to the hand of the operator.

The invention consists essentially of a starting crank having an axle or shaft composed of two separate parts which are normally united by a coupling which is adapted to automatically sever the connection between the two parts on an engine backfiring.

Referring to the drawings, Figure 1 is a side elevation of a starting crank embodying the present invention. In this view the coupling is shown as locked.

Figure 2 is an enlarged view of the coupling depicting the two parts of the shaft of the crank unlocked.

Figure 3 is a similar view to Figure 2 but illustrates the parts partially in section.

Figure 4 is a transverse sectional view taken on the line 4—4 of Figure 2 showing in conjunction therewith a bracket that is carried by the car for the purpose of holding the ratchet stationary.

Like numerals of reference indicate corresponding parts in each figure of the drawings.

In the drawings, the reference numeral 10 indicates the handle of the starting crank which is carried by the arm 11. The shaft of the crank is composed of two parts one, 12, which is integral with the arm 11 and the other part 13 carries a pin 14 for engagement with the conventional ratchet on the crankshaft of the engine. The two members of the shaft are normally interlocked by a coupling which is generally indicated by the numeral 15. This coupling comprises a spiral-jaw clutch that is composed of two members, one of which 16 is integral with the shaft 12 while the other member 17 is integral with the complimentary shaft 13. This spiral-jaw clutch utilizes the helical faces 18 for the purpose of communicating motion between the two shafts, which faces extend backwardly with respect to the direction in which the crank is turned when cranking the car. By this construction it will be evident that the clutch will disengage whilst cranking unless some axial obstruction or resistance is provided to prevent the jaws from spreading.

The clutch is preferably diametrically enlarged as shown in order that one of the members may be bored as at 19 for the purpose of receiving a tang 20 integral with the member 16, which provides an interfitting structure for supporting one part of the crank on the other part.

21 is a sleeve loosely fitting over the clutch. This sleeve carries a pair of diametrically opposed slots 22 which extend circumferentially. 23 is a pin diametrically extending from the jaw member 16 and having its ends projecting in the slots 22 for the purpose of keying the sleeve to the handle member of the crank and at the same time allowing the sleeve to partly turn about the clutch.

In the drawing one of the slots with its projecting pin end is shown, the opposing slot and pin end being hidden from view.

24 is a pin diametrically extending from the jaw member 17 and having its ends slightly projecting therefrom. These pin ends are engageable in opposing bayonet slots 25, the faces 26 of which are cut spirally to conform with the helical faces 18 of the clutch.

From this description it will be evident that upon turning the sleeve so that the pin 24 is engaged in the bayonet slots 25 the clutch will be positively locked, thus preventing the jaws from spreading, but upon slightly turning the sleeve 21 forwardly to the position shown in Figure 2 the pin 24 disengages from the bayonet slots 25, thus permitting the jaws of the clutch to disengage.

27 is a ratchet mounted freely on the shaft 13 and provided with teeth 28 on its inner face and a square section 29 at its outer end which is shouldered in any suitable manner such as by means of a pin 30. This square section is for the purpose of entering an aperture 31 of similar cross section which is provided in a bracket 32, see Figure 4. This bracket it attached to the vehicle and is a permanent part thereof. The bracket functions to hold the ratchet stationary. 33 is a spring-urged click engaged with the teeth 28 of the ratchet. Said click is housed in an integral housing 34 carried by the sleeve 21. 35 is a button-head screw extending from the click and protruding through a slot in the housing 34.

In the operation of the invention, the two parts of the shaft are locked together as heretofore recounted and the cranking operation carried out in the usual manner, the click 33 riding over the ratchet teeth 28, thus retaining the engagement of the pin 24 in the bayonet slots 25.

In the event of the engine backfiring, the shaft 13 turns rearwardly on account of its positive connection, but on account of the click 33 engaging the ratchet the sleeve 21 is held against retrogressive action, hence the pin 24 is disengaged from the bayonet slots and coincidentally the clutch members 16 and 17 are disengaged, thus severing the connection between the crank handle portion and the shaft 13.

To couple the members 12 and 13 again it is simply necessary to engage the jaws 16 and 17 of the clutch, manually release the click by means of the button 35 and then turn the sleeve 21 backwardly so as to reengage the pin 24 with the bayonet slots 25, subsequently letting go of the click.

By this construction it will be readily seen that in the event of the engine backfiring, no backward motion is communicated to the handle of the crank and this renders the operator immune from injury on this account.

What I claim is:—

1. In a starting crank of the class described, a shaft composed of two parts, a spiral jaw clutch for connecting the two parts to each other, a sleeve surrounding the clutch and having a bayonet slot therein, a pin projecting from a clutch-jaw for engagement with the bayonet slot, means for keying the sleeve to the other jaw but permitting it to fractionally turn about the jaws and means for holding the sleeve from turning backwardly with the aforesaid shaft.

2. In a starting crank of the class described, a shaft composed of two parts, a spiral jaw clutch for connecting the two parts to each other, a sleeve surrounding the clutch and having a bayonet slot therein, a pin projecting from a clutch jaw for engagement with the bayonet slot, a pin projecting from the other jaw and disposed in a further slot in the sleeve and means for holding the sleeve from turning backwardly with the aforesaid shaft.

3. In a starting crank of the class described, a shaft composed of two parts, a jaw clutch for connecting the two parts to each other, a sleeve enclosing a clutch jaw and provided with a bayonet slot for engagement with a pin on the other jaw, a ratchet mounted upon the aforesaid shaft, a spring-pressed click carried by the sleeve for engaging the teeth thereof and means to be carried by the engine to be cranked for holding the ratchet stationary.

4. In a starting crank of the class described, a shaft composed of two parts, a jaw clutch for connecting the two parts to each other, a sleeve enclosing a clutch jaw and provided with a bayonet slot for engagement with a pin on the other jaw, a ratchet mounted upon the aforesaid shaft, a spring-pressed click carried by the sleeve for engaging the teeth thereof, and a bracket provided with a non-circular aperture for receiving a non-circular section of the said ratchet.

Signed at Montreal, Canada, the 22nd day of September, 1926.

CHARLES IRVINE.